(12) United States Patent
Stein et al.

(10) Patent No.: US 9,114,414 B2
(45) Date of Patent: Aug. 25, 2015

(54) FLOW REGULATOR

(75) Inventors: Alexander Stein, Ihringen (DE); Christoph Weis, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 13/206,822

(22) Filed: Aug. 10, 2011

(65) Prior Publication Data

US 2013/0032231 A1    Feb. 7, 2013

(30) Foreign Application Priority Data

Aug. 5, 2011  (DE) .......................... 10 2011 109 501

(51) Int. Cl.
| | |
|---|---|
| *E03C 1/08* | (2006.01) |
| *A62C 31/00* | (2006.01) |
| *B05B 3/04* | (2006.01) |
| *B05B 3/16* | (2006.01) |
| *B05B 1/34* | (2006.01) |
| *B05B 1/30* | (2006.01) |
| *B05B 1/18* | (2006.01) |
| *E03C 1/084* | (2006.01) |
| *B05B 1/14* | (2006.01) |

(52) U.S. Cl.
CPC .................. *B05B 1/3026* (2013.01); *B05B 1/18* (2013.01); *B05B 3/04* (2013.01); *E03C 1/08* (2013.01); *E03C 1/084* (2013.01); *B05B 1/14* (2013.01); *Y10T 137/8593* (2015.04)

(58) Field of Classification Search
CPC ............. E03C 1/084; E03C 1/08; B05B 3/04; B05B 3/0486; B05B 3/06; B05B 3/063; B05B 3/066; B05B 1/18

USPC .............. 239/428.5, 223, 224, 506, 509, 512, 239/380–383; 138/41, 42, 43, 46
See application file for complete search history.

(56) References Cited

U.S. PATENT DOCUMENTS

| | | | | | |
|---|---|---|---|---|---|
| 3,698,832 | A | * | 10/1972 | Price .............................. | 415/148 |
| 3,762,648 | A | * | 10/1973 | Deines et al. ................. | 239/381 |
| 3,804,336 | A | * | 4/1974 | Koeppe .......................... | 239/383 |
| 4,105,162 | A | * | 8/1978 | Drori ............................. | 239/109 |
| 4,190,207 | A | * | 2/1980 | Fienhold et al. .............. | 239/381 |
| 4,203,550 | A | * | 5/1980 | On ................................. | 239/381 |
| 4,478,367 | A | * | 10/1984 | Petursson ..................... | 239/381 |
| 4,588,130 | A | * | 5/1986 | Trenary et al. ................ | 239/381 |
| 5,246,201 | A | * | 9/1993 | Messick ........................ | 251/208 |
| 5,291,621 | A | * | 3/1994 | Mathis ........................... | 4/541.4 |
| 5,386,598 | A | * | 2/1995 | Mersmann ..................... | 4/541.4 |
| 5,402,821 | A | * | 4/1995 | Harstad ......................... | 137/556 |

(Continued)

FOREIGN PATENT DOCUMENTS

| | | |
|---|---|---|
| DE | 1658159 | 8/1970 |
| DE | 3828111 | 2/1990 |
| FR | 717025 | 12/1931 |

*Primary Examiner* — Len Tran
*Assistant Examiner* — Alexander Valvis
(74) *Attorney, Agent, or Firm* — Volpe and Koenig, P.C.

(57) ABSTRACT

The invention relates to a flow regulator (1) having a flow regulator housing, with a rotor disk (9) being supported in a rotary fashion in the interior space of its housing, which is embodied at least in a partial section of the disk in a liquid-permeable fashion and (9) is in a driven connection with a rotor disk drive, which transfers the flow of the water flowing through the flow regulator housing into a rotary drive force used for a rotary motion of the rotor disk (9). Using the flow regulator according to the invention considerable water savings can be achieved without here any reduction of the volume flow being clearly discernible.

19 Claims, 4 Drawing Sheets

(56) References Cited

U.S. PATENT DOCUMENTS

| | | | |
|---|---|---|---|
| 5,576,489 A * | 11/1996 | Munck et al. | 73/257 |
| 5,862,985 A * | 1/1999 | Neibrook et al. | 239/99 |
| 5,943,711 A * | 8/1999 | Loizeaux et al. | 4/541.6 |
| 6,242,828 B1 * | 6/2001 | Rose, Sr. | 310/74 |
| 6,350,378 B1 * | 2/2002 | Oyabu | 210/198.1 |
| 6,513,731 B2 * | 2/2003 | Griffin et al. | 239/394 |
| 6,860,437 B1 * | 3/2005 | Amendt et al. | 239/383 |
| 6,991,182 B2 * | 1/2006 | Chen | 239/251 |
| 7,594,519 B2 * | 9/2009 | Hart et al. | 138/43 |
| 7,896,259 B2 * | 3/2011 | Meisner et al. | 239/383 |
| 7,988,071 B2 * | 8/2011 | Bredberg | 239/203 |
| 8,205,810 B2 * | 6/2012 | Lacher et al. | 239/428.5 |
| 8,286,480 B2 * | 10/2012 | Holmes-Higgin et al. | 73/253 |
| 8,366,024 B2 * | 2/2013 | Leber | 239/381 |
| 2005/0188762 A1 * | 9/2005 | Droin et al. | 73/253 |
| 2010/0019065 A1 * | 1/2010 | Denzler | 239/428.5 |
| 2010/0065661 A1 * | 3/2010 | Grether et al. | 239/428.5 |
| 2013/0068860 A1 * | 3/2013 | Tempel | 239/428.5 |

* cited by examiner

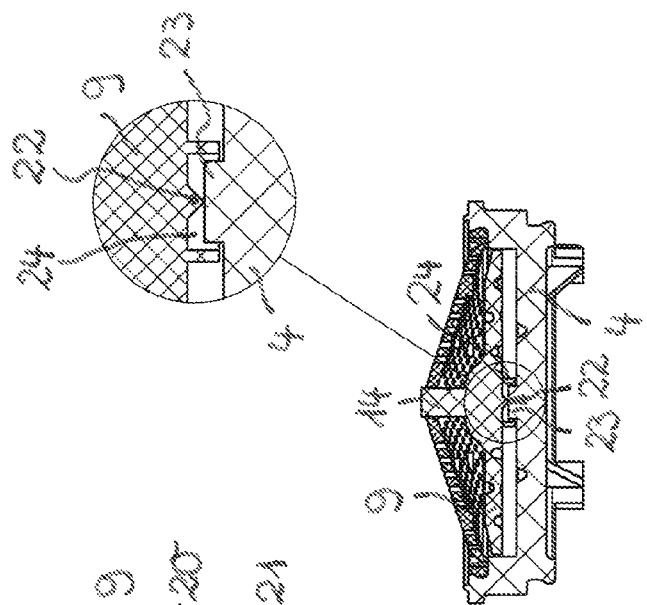
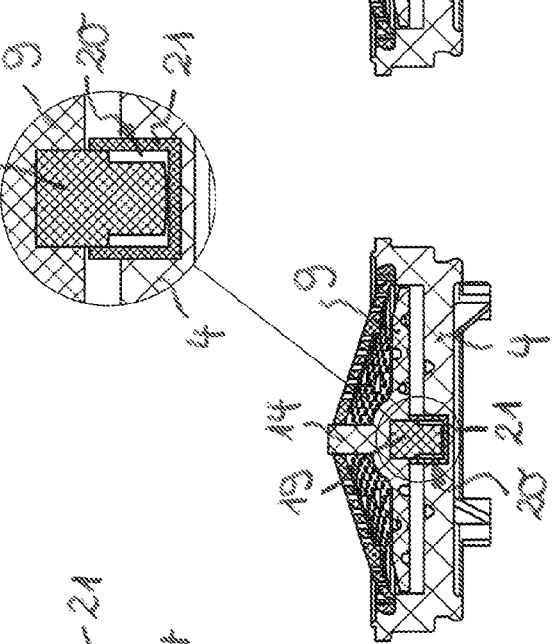
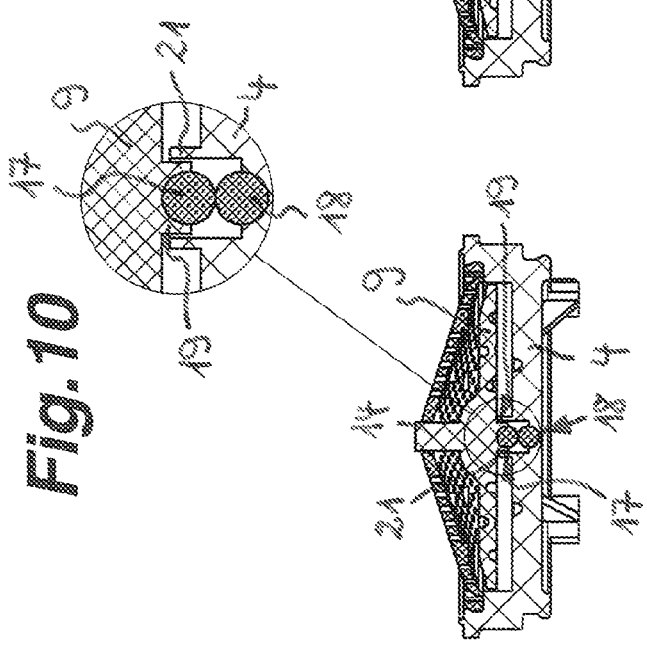

FLOW REGULATOR

CROSS-REFERENCE TO RELATED APPLICATIONS

This application claims the benefit of German Patent Application No. 10 2011 109 501.6, filed Aug. 5, 2011.

BACKGROUND

The invention relates to a flow regulator. Flow regulators are known in most different embodiments as aerated and unaerated flow regulators. Such flow regulators should form the water flowing out of a sanitary faucet into a homogenous, non-splashing and, if applicable, also pearly-soft water jet. Such flow regulators should not only improve the comfort for the user in the context with water exiting, but frequently also affect considerable water savings. For example, water savings are achieved by adding environmental air to the water flowing through the flow regulator without the volume flow being noticeably reduced.

The chances for water savings by adding air into the water flowing through the flow regulator are limited, though.

SUMMARY

Therefore it is the objective to provide a flow regulator of the type mentioned at the outset by which, in addition or instead of mixing air, additional considerable water savings can be achieved without any reduction of the volume flow becoming clearly discernible.

The solution of this objective is met by a flow regulator according to the invention.

The flow regulator according to the invention comprises in the interior of its flow regulator housing a rotationally supported rotor disk, which is embodied in a liquid-permeable fashion at least in a partial section of the disk. This rotor disk is in a driven connection with a rotor disk driving force, which transfers the flow of the water flowing through the flow regulator housing as the rotationally driving force for a rotational motion of the rotor disk. Using this rotor disk driving force, the flow used as the rotationally driving force can be transferred into a rotational motion of the rotor disk. Due to the fact that water can only pass the flow regulator housing in the area of the rotor disk in the area of the partial section of the disk that is embodied liquid-permeable, a water jet is formed which for example comprises a helical cross-section or, among other things depending on the rotation of the rotor disk, by pulsed partial sections of the jet splitter. Thus, the flow regulator according to the invention creates a time-pulsed water jet by a brief opening and closing of the water flow. These flow interruptions create a reduction of the cumulative volume flow proportionate to their duration. When the duration of the interruption is shorter than the temporal resolution of the human eye, the pulsed water jet is not even recognized by the user as a pulsed or a briefly interrupted one. Even when the interrupted periods are longer, so that the user can visually detect them, this does not have adverse effects on the comfort when using a sanitary faucet. Thus, using the flow regulator according to the invention, considerable water conservation can be achieved without any reduction of the volume flow being clearly discernible.

In order to embody the rotor disk in a liquid-permeable fashion, at least in partial sections of the disk, the rotor disk may at least comprise a notch, preferably extending to the rotary axis of the disk and particularly embodied like a piece of a pie. In the area of this at least one disk notch, the rotor disk is liquid permeable. In order to allow embodying the rotor disk liquid-permeable on the one hand and sufficiently stable on the other hand a preferred embodiment according to the invention comprises that the rotor disk exhibits several flow holes, which preferably are arranged at different distances from the rotational axis and with at least one circular path section around the rotational axis being unperforated. In this preferred embodiment the rotor disk is only embodied in a liquid-permeable fashion in the area of the flow holes.

An advantageous embodiment according to the invention provides that the rotary disk drive comprises at least one driving blade projecting from the rotor disk at the upstream and/or downstream side arranged diagonally in reference to the plane of the rotor disk such that the water impinging at least one driving blade enacts a rotational driving force upon the rotor disk.

A preferred further development according to the invention, which facilitates a particularly space-saving design of the flow regulator according to the invention and can be produced with comparatively little expense, provides, however, that as the rotor disk drive at least one of the flow holes has a longitudinal axis tilted in reference to the rotational axis such that the water flowing through at least one diagonally tilted flow hole enacts a rotary driving force upon the rotor disk.

No massaging effect shall be achieved with the water flow exiting the flow regulator according to the invention; rather it serves only to save water by the pulsing water flow created by the rotor disk. Thus, it may be advantageous for at least one jet forming and/or flow regulating insert to be arranged in the flow regulator housing, downstream in reference to the rotor disk.

Here, particularly beneficial embodiments according to the invention provide for a perforated plate and/or at least one grid or mesh structure being arranged in the flow regulator housing, in the direction of flow downstream in reference to the rotor disk.

It is beneficial for at least one insert, which can be inserted into the flow regulator housing, to comprise a grid or mesh structure with bars crossing at the intersection hub. While the grid structure may be performed at the intersecting hubs preferably by bars crossing at a right angle, a mesh structure may also be formed by a respective multitude of radially or concentric bars crossing at the intersecting hub.

It is particularly advantageous for at least one insert, which can be inserted into the flow regulator housing, to have a grid or mesh structure of bars crossing at the intersecting hub. Such an insert, which can be inserted into the flow regulator housing, facilitates the simple production and assembly of the flow regulator according to the invention.

The flow regulator according to the invention may be embodied as an aerated or unaerated flow regulator. When the flow regulator according to the invention is embodied as an aerated flow regulator it may be beneficial for a jet splitter to be immediately arranged downstream in reference to the rotor disk, with this jet splitter is preferably embodied as a perforated plate.

In order for the water to flow through every section of the jet cross-section, at least periodically, it is advantageous for the flow holes to be provided in the rotor disk on at least two annular paths, located at different distances from the rotary axis.

A homogenous appearance of the water jet created in the flow regulator according to the invention is promoted when the rotor disk can be divided into at least two sectors by diagonals intersecting at the rotational axis, and when sectors provided with flow holes and unperforated sectors alternate in the direction of rotation of the rotor disk.

In order to keep the friction forces to be overcome by the rotation of the rotor disk as low as possible it is beneficial for the rotor disk not to be supported in the flow regulator housing at the circumference of the disk but in its rotational axis.

A smooth and secure rotary motion of the rotor disk is promoted if a rotary bearing and/or rotary guide is provided between the rotor disk and a bearing support held immobile in the flow regulator housing.

Here, a preferred embodiment according to the invention provides that the rotor disk preferably comprises a guide converter or a guide pin, preferably annular in its cross-section, which cooperates as a rotary bearing and/or rotary guide with a guide pin or a guide converter at the bearing support.

In order to keep the friction forces opposing the rotary motion as low as possible it may be beneficial for the rotor disk to be supported on the bearing support via two bearing balls impinging each other.

Here, a preferred embodiment provides that the bearing balls impinging each other are preferably chrome-plated metal balls. When the rotor disk is supported on the bearing support via two metal balls contacting each other punctually the friction forces countering the rotary driving force can be kept relatively low. Any undesired wear is countered and the friction forces are additionally reduced if these metal balls are chrome-plated.

An alternative further embodiment according to the invention provides that a bearing tip is provided at the rotor disk or the bearing support, arranged in the rotary axis, which punctually impinges the bearing support or the rotor disk.

The friction forces between the rotary disk and the bearing support can additionally be reduced and effectively counteract wear and tear when the rotor disk and/or the bearing support is/are produced from ceramic, at least in the partial section impinging the respectively other bearing part. The bearing support provided for the rotor disk can be formed in one piece, at least in a component of the flow regulator according to the invention. However, an embodiment is preferred in which the bearing support is embodied as a component which is preferably inserted into a part of the flow regulator according to the invention arranged downstream in reference to the direction of flow.

A secure guidance of the rotor disk about the rotary axis is promoted when the rotor disk is supported rotationally also on its side opposite the bearing support.

Here, a preferred embodiment according to the prevention provides, for example, that the rotor disk has a guide pin or a guide opening on its side facing away from the bearing support, which cooperates with a guide opening or a guide pin as a rotary bearing, connected to the flow regulator housing in a locally fixed fashion.

A particularly compact and safely functioning embodiment according to the invention provides that the flow regulator has a sieve attachment, with a guide pin or a guide opening being provided at a rotary bearing. The sieve attachment may comprise, for example, a guide pin at its downstream side, which projects into a respective guide opening in the rotor disk. However, it is also possible that the rotor disk comprises at its influx side facing away from the bearing support a guide pin, preferably arranged coaxially in reference to the rotary axis, projecting into a guide opening in the sieve attachment.

In order for the water incoming from the rotor disk to pass the bearing support it is advantageous when the bearing support is embodied as a perforated plate.

Here, a preferred embodiment according to the invention provides that the bearing support embodied as a perforated plate forms the jet splitter of an aerated flow regulator.

BRIEF DESCRIPTION OF THE DRAWINGS

Further developments according to the invention result from the description in combination with the drawings. In the following the invention is explained in greater detail using preferred exemplary embodiments.

Shown are.

DETAILED DESCRIPTION OF THE PREFERRED EMBODIMENTS

Figure 1:
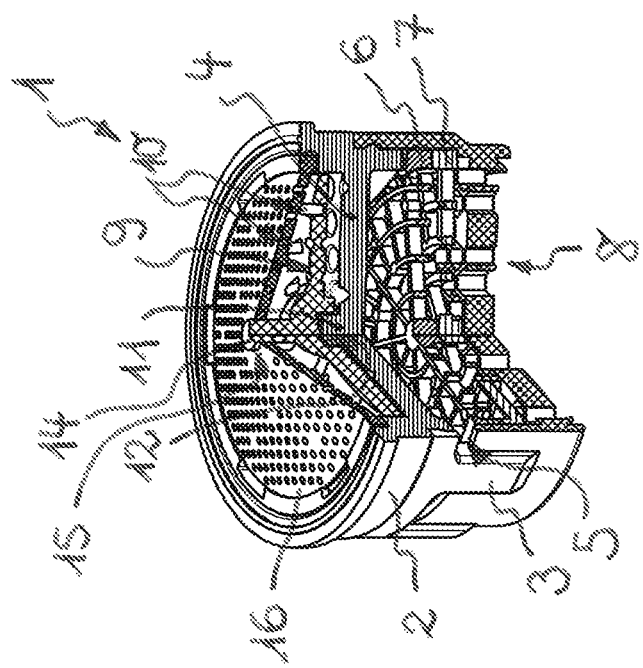
FIG. 1 a flow regulator shown partially in section, which comprises a rotationally supported rotor disk in the interior of its flow regulator housing, FIG. 2 the flow regulator of FIG. 1 with its rotor disk shown here also being partially in section, FIG. 3 the rotor disk of the flow regulator of FIGS. 1 and 2 with the flow regulator part arranged upstream and downstream in an exploded perspective view of individual parts, FIG. 4 the rotor disk of the flow regulator shown in FIGS. 1 and 2, supported in a rotational fashion between the upstream and the downstream flow regulator part, in a partial section perspective view focusing on the upstream side, FIG. 5 the rotor disk of the flow regulator shown in FIGS. 1 and 2, rotationally supported between the upstream and the downstream flow regulator component, in a partial section perspective view with focus on the downstream side, FIG. 6 the rotor disk shown in FIGS. 1 through 5 in a top view of its upstream side, FIG. 7 the rotor disk shown in FIGS. 1 through 6 in a longitudinal cross-section through the section plane VII-VII in FIG. 6, FIG. 8 a detailed view of the longitudinal cross-section of the rotor disk according to FIG. 7 in the area of one of the flow holes provided in the rotor disk, FIG. 9 a rotor disk with a rotational support, which is formed by two preferably chrome-plated metal balls, which are provided between the rotor disk and the flow regulator component arranged at the downstream side, FIG. 10 the rotational support of the rotor disk of FIG. 9 in a detail view in the area of the metal balls, FIG. 11 a rotor disk with a rotational support, which is formed from a guide pin provided at the rotor disk, which is inserted into a guide opening in the flow regulator component at the downstream side, with the guide pin and the wall section surrounding the guide opening preferably being made from ceramics, FIG. 12 the rotational support of the rotor disk of FIG. 11 in the area of the wall section surrounding the guide opening and the guide pin also made from ceramics, FIG. 13 a rotor disk with a rotational support, comprising a bearing tip arranged at the downstream side of the rotor disk, which bearing tip only punctually impinges the bearing support arranged at the downstream side, and FIG. 14 the rotational support of the rotor disk of FIG. 13 in a detail view in the area of the bearing tip formed at the rotor disk.
Figure 2:
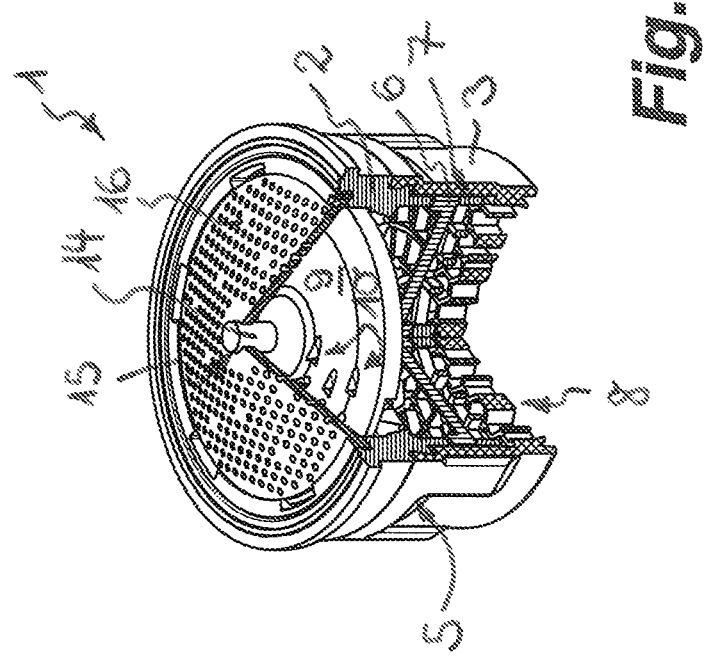

FIGS. 1 and 2 show a flow regulator 1, which can be inserted into a discharge mouth, not shown here, that can be assembled at the water outlet of a sanitary faucet. The flow regulator 1 forms the water flowing out of the water outlet into a homogenous and non-splashing water jet.

The flow regulator 1 comprises a flow regulator housing. The flow regulator housing is here embodied in two parts and comprises an upstream housing part and a downstream housing part 2, 3, that can be connected to each other in a detachable fashion. A jet splitter 4 is formed on the housing part 2 at the upstream side, which splits the water flowing through into a multitude of individual jets and accelerates these individual jets such that a vacuum develops at the downstream side of the jet splitter 4. The vacuum created at the downstream side of the jet splitter 4 suctions environmental air through the vent openings 5 provided at the housing perimeter, with here the suctioned environmental air being mixed with the individual jets created by the jet splitter 4 before the water mixed with air in this fashion can be slowed down by the grid or mesh structures comprising individual parts 6, 7, following in the direction of flow. At the housing part 3, located at the downstream side, a flow straightener 8 is formed at its outlet face, which combines the water flowing out and mixed with air into a homogenous and pearly-soft water jet. The flow straightener 8, additionally preventing the pushing-up of the inserts 6, 7 into the flow regulator housing, may for this purpose have for example a honeycomb-like perforated structure, a grid structure, or a mesh structure, as shown here, with bars radially as well as concentrically crossing at intersection hubs.

Figure 8:
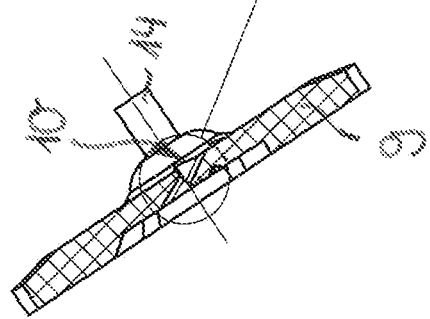

By adding and mixing air in the interior of the housing of the flow regulator 1 the out-flowing amount of water can be reduced without here the considerable reduction of the water volume being noticeable. In order to even further increase the desired water saving effect here an essentially annularly embodied rotor disk 9 is arranged in the interior of the flow regulator housing, supported rotationally about a rotary axis. This rotary disk 9 is embodied in liquid-permeable fashion, at least in a partial section of the disk, and is in a driven connection with a rotor disk drive, which transforms the flow of the water flowing through the flow regulator housing used as the rotational driving force into a rotary motion of the rotor disk 9. In order to embody the rotor disk 9, at least in partial sections of the disk, to be liquid permeable the rotor disk 9 shown here comprises several flow holes 10, which are arranged at different distances from the rotary axis. As discernible from FIG. 1 and the top views of FIGS. 3 and 6, at least one annular section of the circular paths of the perforations 10 is un-perforated. In the longitudinal cross-sections in FIGS. 8 and 9 it is discernible that at least one of the flow holes 10 and here all flow holes 10 comprise an axis of the holes tilted in reference to the rotational axis such that the water flowing through the diagonally tilted flow holes 10, a rotational driving force is enacted upon the rotor disk 9.

The flow regulator 1 shown here therefore comprises the rotationally supported rotor disk 9 in the interior of its flow regulator housing, which shows several flow holes 10 arranged at different distances from the rotary axis. On the annular path around the rotary axis, it may be possible that additional flow holes 10 are provided together with each of these flow holes 10, as in the present case, however, at least one section of the annular path of the respective circular path is unperforated. At least one of these flow holes 10 comprises a longitudinal axis of the perforation tilted in reference to the rotary axis of the rotary disk such, that the water flowing through at least one flow hole 10 enacts a rotationally driving force upon the rotor disk 9 and makes it rotate. Due to the fact that the water of the flow regulator housing can pass in the area of the rotor disk 9 essentially only at the flow hole 10, the jet splitter 4 located downstream receives the incoming water only via the flow hole 10 of the rotating rotor disk 9. The jet splitter 4 therefore receives only one pulsed jet, dependent on the rotation of the rotor disk 9, and accelerates it for further enrichment and mixing with air. Here, the pulse frequency is defined by the rotation and the number of flow holes 10 provided in the respective circular path of the rotor disk 9. Here, a water jet is formed, which may be periodically pulsed by a brief opening and closing of the flow. This leads to a reduction of the cumulative volume flow by the interruptions of flow, proportional to their duration. When the period of interruption is shorter than the resolution capacity of the human eye the pulsed water jet is not even recognized by the user as a pulsed or briefly interrupted water jet. Alternatively, by this arrangement a combination of a helical and spiral-shaped jet (helix expanding over the length of the jet) can be formed. Using the flow regulator 1 shown here an additional water saving effect can be achieved without any reduction of the volume flow being clearly discernible.

Figure 3:
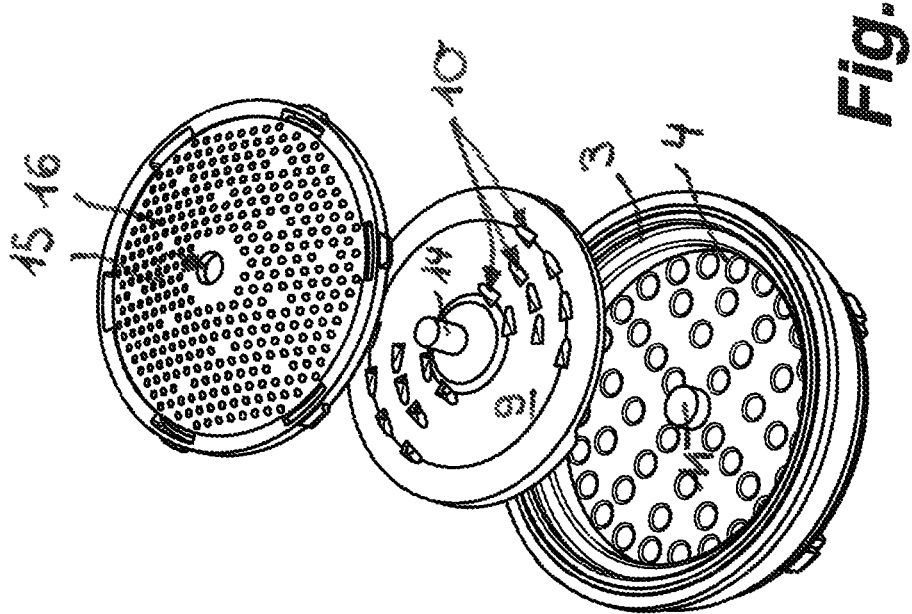
Figure 4:
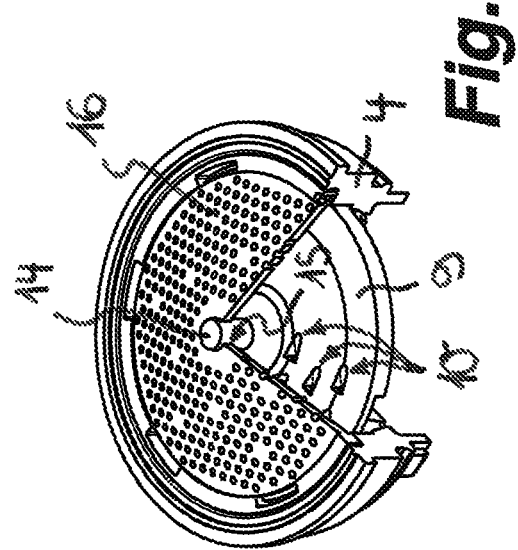
Figure 5:
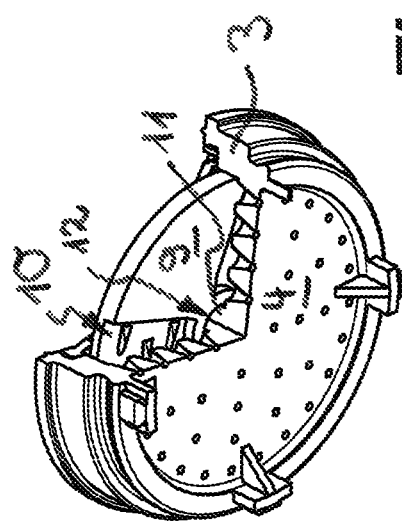
Figure 7:
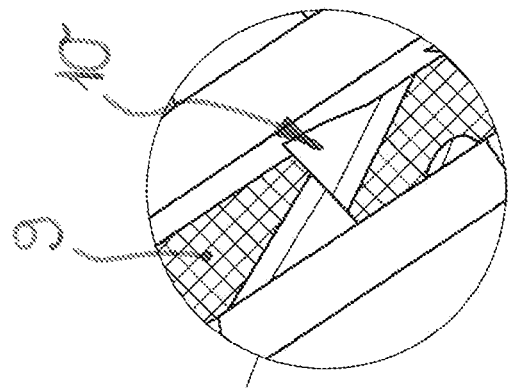
Figure 6:
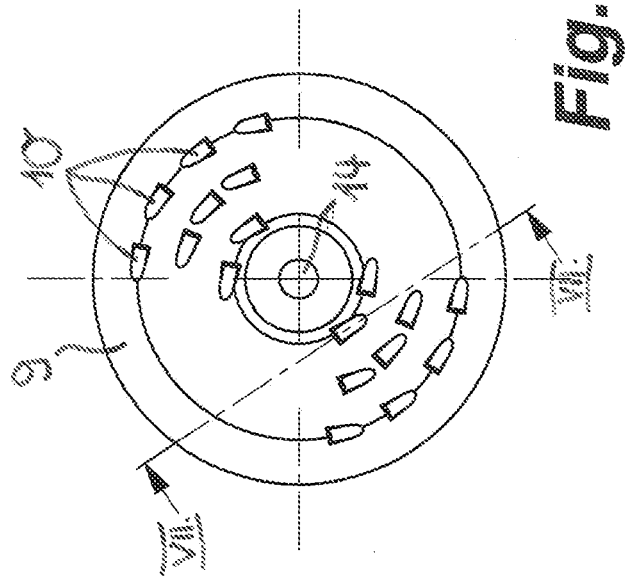

It is discernible from FIGS. 3 and 6 that the flow holes 10 provided in the rotor disk 9 are arranged on at least two, and here three, circular paths located at different distances from the rotary axis. In FIG. 6 it is indicated that the rotor disk 9 can be divided into sectors by at least two diagonals intersecting in the rotational axis and that the sectors provided with flow holes 10 in the rotational direction of the rotor disk 9 alternate with sectors that are non-perforated. It is discernible from FIGS. 3 and 6 that here two sectors provided with flow holes 10 and two unperforated sectors of the rotor disk 9 are located opposite each other.

In the partially sectioned perspective illustrations in FIG. 2 it is discernible that the rotor disk 9 is supported in its rotary axis in the flow regulator housing. Here, a rotary bearing and rotary guide is provided between the rotor disk 9 and a bearing support held in the flow regulator housing in a non-shiftable fashion and here formed by the jet splitter 4. For this purpose, a central guide pin 11 is formed upstream at the jet splitter 4 embodied as a perforated plate, which projects into a guide opening 12 at the downstream side of the rotor disk 9, which guide opening 12 being surrounded by a guide wall, circular in its cross-section.

In order to ensure a secure rotary motion of the rotor disk 9 about the rotational axis the rotor disk 9 is also supported rotational at its side facing away from the bearing support. For this purpose, the rotor disk 9 comprises a guide pin 14 at its side facing away from the bearing support which projects into a guide opening 15 connected in a locally fixed manner to the flow regulator housing and cooperating therewith as a rotary support at the inlet side. This guide opening 15 is provided centrally in an attachment sieve 16, which shall prevent the penetration of contaminants into the interior of the flow regulator housing and is connected thereto in a detachable fashion.

Various options are shown in FIGS. 9 through 14 to support the rotary disk 9 in the interior space of the flow regulator housing in a rotational fashion without excessive friction forces counteracting the rotary motion of the rotor disk 9.

In the exemplary embodiment shown in FIGS. 9 and 10 the rotor disk 9 rests on two punctually impinging bearing balls 17, 18 of the jet splitter 4, here serving as the bearing support. These bearing balls 17, 18, with one of them being formed in the downstream side of the rotor disk 9 and the other one in the upstream side of the bearing support, are preferably embodied as metal balls, particularly chrome-plated at their surface.

In the exemplary embodiment shown in FIGS. 11 and 12 a guide pin 19 is provided at the downstream side of the rotor disk 9, which engages a guide opening 20 in the jet splitter 4 serving as the bearing support. Both the wall section 21 surrounding the guide opening 20 as well as the guide pin 19 are here produced from a ceramic material in order to keep the friction forces counteracting the driving force as low as possible and to counteract any wear and tear.

In the exemplary embodiment shown in FIGS. 13 and 14, a bearing tip 22 is formed at the downstream side of the rotor disk 9, which punctually impinges the adjacent face of a guide pin 23 formed at the bearing support.

From a comparison of FIGS. 9 through 14 it is discernible that the rotor disk 9 comprises a guide wall 24 (cf. FIGS. 13, 14), preferably having a circular cross-section, or a guide pin 19 (cf. FIGS. 9, 10; 11, 12), cooperating with a guide pin 23 (cf. FIG. 13, 14) or a guide wall 21 (cf. FIGS. 9, 10; 11, 12) as the bearing support, here embodied as the jet splitter 4, being the rotary guide.

LIST OF REFERENCE CHARACTERS

1 Flow regulator
2 Housing part (upstream side)
3 Housing part (downstream side)
4 Jet splitter
5 Vent openings
6 Insert (upper)
7 Insert (lower)
8 Flow straightener (at the housing part 3)
9 Rotor disk
10 Flow hole (in the rotor disk 9)
11 Guide pin (at the jet splitter 4 according to FIGS. 1 and 2)
12 Guide opening (at the rotor disk 9 according to FIGS. 1 and 2)
13 Guide wall (of the guide opening 12 in FIGS. 1 and 2)
14 Guide pin (at the upstream side of the rotor disk 9)
15 Guide opening (in the attachment sieve 16)
16 Attachment sieve
17 Bearing ball (upper)
18 Bearing ball (lower)
19 Guide pin (at the rotor disk 9 according to FIGS. 11, 12)
20 Guide opening (in the jet splitter 4 according to FIGS. 11, 12)
21 Wall section (surrounding the guide opening 20 in FIGS. 11, 12)
22 Bearing tip (according to FIGS. 13, 14)
23 Guide pin (at the jet splitter 4 according to FIGS. 13, 14)
24 Guide wall (rotor disk 9 according to FIGS. 13, 14)

The invention claimed is:

1. A flow regulator (1), having an upstream inlet portion and a downstream outlet portion, comprising a flow regulator housing, with a rotor disk (9) being rotationally supported in an interior space of the housing, the rotor disk (9) is liquid permeable at least in a partial section of the disk and is driven by a driving force that converts a flow of water flowing through the flow regulator housing into a rotational driving force for a rotary motion of the rotor disk (9) wherein the rotor disk (9) comprises at least one flow hole (10) having a longitudinal axis tilted diagonally in reference to a rotary axis such that water flowing through the at least one diagonally tilted flow hole (10) enacts the rotational driving force upon the rotor disk (9), at least one drive blade projects from the rotor disk at at least one of an upstream or a downstream side, that is arranged in reference to a plane of the rotor blade in a diagonal fashion such that water impinging the at least one drive blade enacts the rotational driving force upon the rotor disk and wherein the rotor disk (9) is directly followed downstream by a jet splitter (4).

2. A flow regulator according to claim 1, wherein the rotor disk (9) comprises a plurality of flow holes (10) arranged at different distances from the rotary axis and with at least one circular section on a circular path around the rotary axis being unperforated.

3. A flow regulator according to claim 1, wherein the rotor disk releases or blocks the flow of water to at least one downstream element in the flow regulator housing, limiting the water flow in a direction of flow.

4. A flow regulator according to claim 1, wherein at least one of a perforated plate or at least one grid or mesh structure is arranged downstream in the direction of flow in reference to the rotor disk (9) in the flow regulator housing.

5. A flow regulator according to claim 1, wherein at least one insert, which is inserted into the flow regulator housing, comprises a grid or mesh structure with bars crossing at intersection hubs.

6. A flow regulator according to claim 2, wherein the flow holes (10) provided in the rotor disk (9) are arranged on at least two circular paths located at different distances in reference to the rotary axis.

7. A flow regulator according to claim 2, wherein the rotor disk (9) is divided by at least two diagonals, intersecting at the rotary axis, into sectors, and in a rotational direction of the rotor disk (9) the sectors provided with the flow holes (10) alternate with unperforated sectors.

8. A flow regulator according to claim 1, wherein the rotor disk (9) is supported at the rotary axis in the flow regulator housing.

9. A flow regulator according to claim 8, wherein at least one of a rotary support or a rotary guide is provided between the rotor disk (9) and a bearing support held in a fixed manner in the flow regulator housing.

10. A flow regulator according to claim 9, wherein the rotor disk (9) comprises a guide wall or a guide pin which cooperates with a guide pin (11) or a guide wall as the rotary guide at the bearing support.

11. A flow regulator according to claim 9, wherein the rotor disk (9) rests on the bearing support via two bearing balls (17, 18) impinging each other.

12. A flow regulator according to claim 11, wherein the bearing balls (17, 18) impinging each other are chrome-plated metal balls.

13. A flow regulator according to claim 9, wherein a bearing tip (22), arranged on the axis of rotation, is provided at the rotor disk (9) or at the bearing support, impinging the bearing support or the rotor disk (9) in a punctual fashion.

14. A flow regulator according to claim 9, wherein at least one of the rotor disk (9) or the bearing support are produced from ceramics, at least in a partial section impinging the respectively other bearing part.

15. A flow regulator according to claim 9, wherein the rotor disk (9) is supported rotationally on a side facing away from the bearing support.

16. A flow regulator according to claim 15, wherein the rotor disk (9) has a guide pin (14) or a guide opening on the side facing away from the bearing support, which cooperates with a guide opening (15) or a guide pin connected to the flow regulator housing in a fixed manner as a rotary bearing.

17. A flow regulator according to claim 16, wherein the flow regulator (1) includes an attachment sieve (16), on which the guide pin or the guide opening (15) of the rotary bearing is provided.

18. A flow regulator according to claim 9, wherein the bearing support comprises a perforated plate.

19. A flow regulator according to claim 18, wherein the bearing support embodied as the perforated plate forms a jet splitter (4) of an aerated flow regulator (1).

* * * * *